United States Patent
Arend

(10) Patent No.: US 10,591,349 B2
(45) Date of Patent: Mar. 17, 2020

(54) MEASURING METHOD AND DEVICE FOR MEASURING DEFLECTIONS AT STATOR END WINDINGS

(71) Applicant: ALSTOM Technology Ltd, Baden (CH)

(72) Inventor: Peter Ullrich Arend, Birr (CH)

(73) Assignee: General Electric Technology GmbH, Baden (CH)

( * ) Notice: Subject to any disclaimer, the term of this patent is extended or adjusted under 35 U.S.C. 154(b) by 123 days.

(21) Appl. No.: 15/078,076

(22) Filed: Mar. 23, 2016

(65) Prior Publication Data

US 2016/0282173 A1    Sep. 29, 2016

(30) Foreign Application Priority Data

Mar. 25, 2015  (EP) ..................... 15160804

(51) Int. Cl.
*G01H 1/00* (2006.01)
(52) U.S. Cl.
CPC .................. *G01H 1/003* (2013.01)
(58) Field of Classification Search
CPC ..................................... G01H 1/003
USPC ........................................... 73/660
See application file for complete search history.

(56) References Cited

U.S. PATENT DOCUMENTS

| 6,046,602 | A | * | 4/2000 | Stein | ...................... | G01H 1/003 |
| | | | | | | 324/545 |
| 2004/0000819 | A1 | * | 1/2004 | Jonson | ................... | H02K 1/185 |
| | | | | | | 310/51 |
| 2010/0066315 | A1 | * | 3/2010 | Diatzikis | ................ | H02K 11/20 |
| | | | | | | 322/99 |
| 2010/0081095 | A1 | * | 4/2010 | Shibazaki | ........... | G03F 7/70775 |
| | | | | | | 430/325 |
| 2010/0131227 | A1 | | 5/2010 | Richer et al. | | |
| 2014/0109679 | A1 | | 4/2014 | Rodriguez | | |

FOREIGN PATENT DOCUMENTS

| CN | 103148928 A | 6/2013 |
| EP | 2 503 307 A1 | 9/2012 |
| FR | 2824914 A1 | 11/2002 |
| JP | S55061258 A | 5/1980 |
| JP | 2004132821 A | 4/2004 |

OTHER PUBLICATIONS

NPL—Shally et al. "Generator end winding vibration monitoring", Universities Power Engineering Conference, 2008. UPEC 2008. 43rd International, IEEE, Piscataway, NJ, USA. Sep. 1, 2008, pp. 1-5.

* cited by examiner

*Primary Examiner* — Tarun Sinha
(74) *Attorney, Agent, or Firm* — Dale Davis; Hoffman Warnick LLC

(57) ABSTRACT

The present disclosure relates to a method, a device, and a computer program for measuring deflections at the stator end winding of an electric machine. Disclosed is a measurement method, a device, and a computer program for measuring vibrations at the stator end winding of an electric machine, with the steps of arranging sensors at the stator end winding at different positions, measuring the vibrations with the sensors, measuring the amplitudes and phases of the radial and tangential vibrations with the sensors, deriving displacements of the stator end winding due to vibrations by means of the measured amplitudes and/or phases of the radial and tangential vibrations.

8 Claims, 3 Drawing Sheets

MEASURING METHOD AND DEVICE FOR MEASURING DEFLECTIONS AT STATOR END WINDINGS

CROSS-REFERENCE TO RELATED APPLICATIONS

This application claims priority to European Patent Application 15160804.9 filed Mar. 25, 2015, the contents of which are hereby incorporated in its entirety.

TECHNICAL FIELD

The present disclosure relates to a method and a device for measuring deflections at the stator end winding of an electric machine.

The electric machine is in particular a rotating electric machine such as a synchronous generator to be connected to a gas or steam turbine (turbogenerator) or a synchronous generator to be connected to a hydro turbine (hydro generator) or an asynchronous generator or a synchronous or asynchronous electric motor or also other types of electric machines.

BACKGROUND

Electrically conductive windings are composed from conductor bars to electric coils in electric machines. These coils or windings are made from copper usually. The windings are placed in slots in the core sheets of the rotor or stator of the electric machine. The end pieces of the windings protrude over the slots and are in the case of high energy generators bent in relation to the main winding part housed in the slot. Here, especially the end windings or simply end winding of a stator of an electric machine are considered. The end pieces of the winding, in the following referred to as end winding or stator end winding, have a support which carries and stiffens the high mass of the end winding protruding from the core sheet of the stator. It was discovered that in operation the support and the end winding vibrate with certain frequencies. Further, it was discovered that these vibrations can cause damages to the stator. This is despite of a highly precise manufacturing of all parts, due to electromagnetic fields and rotor unbalances. It is therefore proposed to measure the vibrations of the stator end winding for test operation and in real world operation. This is done in the state of the art by means of common vibration sensors arranged at the stator end winding. The vibration sensors each measure a deflection of the corresponding end winding. The deflections are evaluated afterwards in connection with each other. After evaluation measures against the deflections of the whole circle along the stator end winding can be taken to deduce the deflections.

SUMMARY

It is an object of the invention to provide an alternative method and device for measuring deflections at the stator end winding.

To this end it is provided a measurement method, a measurement device, and a computer program for processing the measurement method according to the independent claims.

Further examples of the invention are described in the dependent claims.

BRIEF DESCRIPTION OF THE DRAWINGS

Further characteristics and advantages will be more apparent from the description of a preferred but non-exclusive embodiment of the measurement method, measurement device, and computer program illustrated by way of non-limiting example in the accompanying drawings, in which.

DETAILED DESCRIPTION

Figure 1:
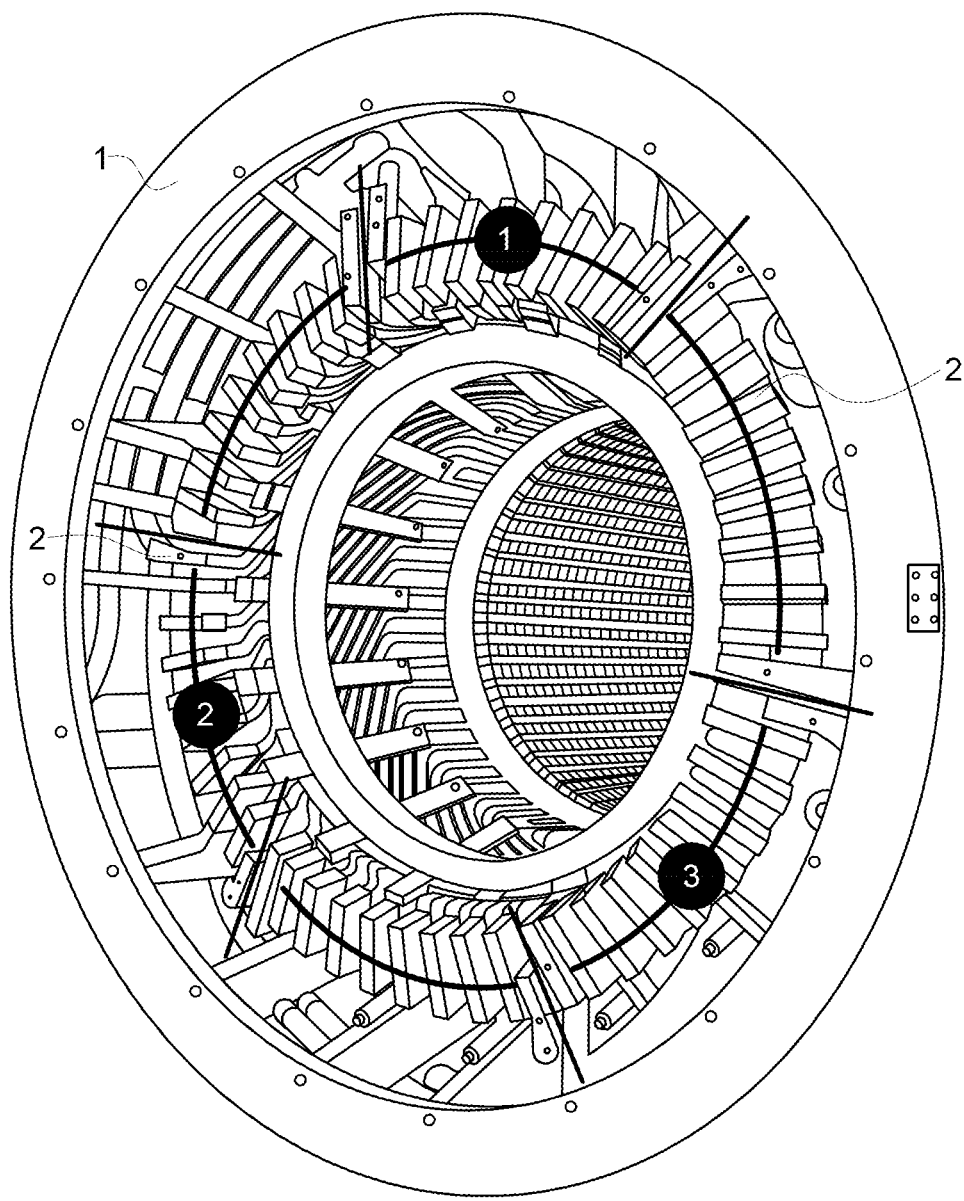
FIG. 1 shows a part of a perspective view of the inside of a stator with end winding and bearing distributed into six segments with three positions for sensors marked by numbers 1, 2, 3 at the termination.

With reference to the figures, these show the principles of a measuring method and a measuring device according to an example of the invention, wherein like reference numerals designate identical or corresponding parts throughout the several views.

FIG. 1 shows a perspective view of a part of a stator 1 with end winding 2, a bearing 3 arranged at the end winding 2, and a stator housing 4 at the outer face of the stator 1. It can be seen that commonly the winding of the stator are inside the stator 1 aligned in parallel in notches of the stator 1. The term end winding 2 refers to the end parts of the winding which project out of the notches of the stator 1 on both ends and are commonly bended, as can be seen in FIG. 1. The end winding 2 projects from the stator inside in the shape of a cone as the separate conductor bars are bended outwards, as can be seen in FIG. 1. The end winding 2 end at the opening of the stator 1 where the end winding 2 are connected to terminals to conduct electric current. The detailed view is marked with bolt bended lines to part the circle into six segments with three circles numbered with 1, 2, 3, to illustrate the position of sensors 6. The sensor positions have an even distance to each other, i.e. a distance of 120° angular distance. The positioning of the sensors 6 is equidistant thus. The sensors 6 are suitable to measure the deflections of the stator end winding 2, the sensors 6 are for example triaxial sensors 6 which are arranged to measure position changes in a radial and tangential direction with reference to the stator end winding 2, especially the ends of the stator end winding 2 forming a circle.

Figure 2:
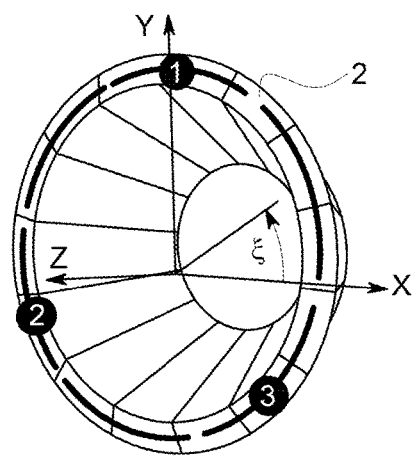
FIG. 2 shows a view of a stator end winding similar to FIG. 1 in a simplified schematic view as a cone, and a coordinate system.

FIG. 2 shows a view of a stator end winding 2 similar to FIG. 1 in a simplified schematic view with lines along the inside of the stator end winding 2 illustrating the radially directed end winding 2 of the stator 1 and the cone shape of the end winding 2. A common 3-dimensional coordinate system is shown with x-axis, y-axis, and z-axis representing the common spacial orientations. The angle $\zeta$ is drawn to illustrate the rotation angle along the circle of the edge of the stator end winding 2, in the 2-dimensional space of the x-axis and the y-axis, illustrated by the bolt bended segment lines. The deflections of the stator end winding 2 are defined along the circle of the edge of the stator end winding 2, which is simply a relation of path, the deflection, and place along the circle. In FIG. 2 no deflections are present, the edge of the end winding 2 forms an ideal circle.

Figure 3:
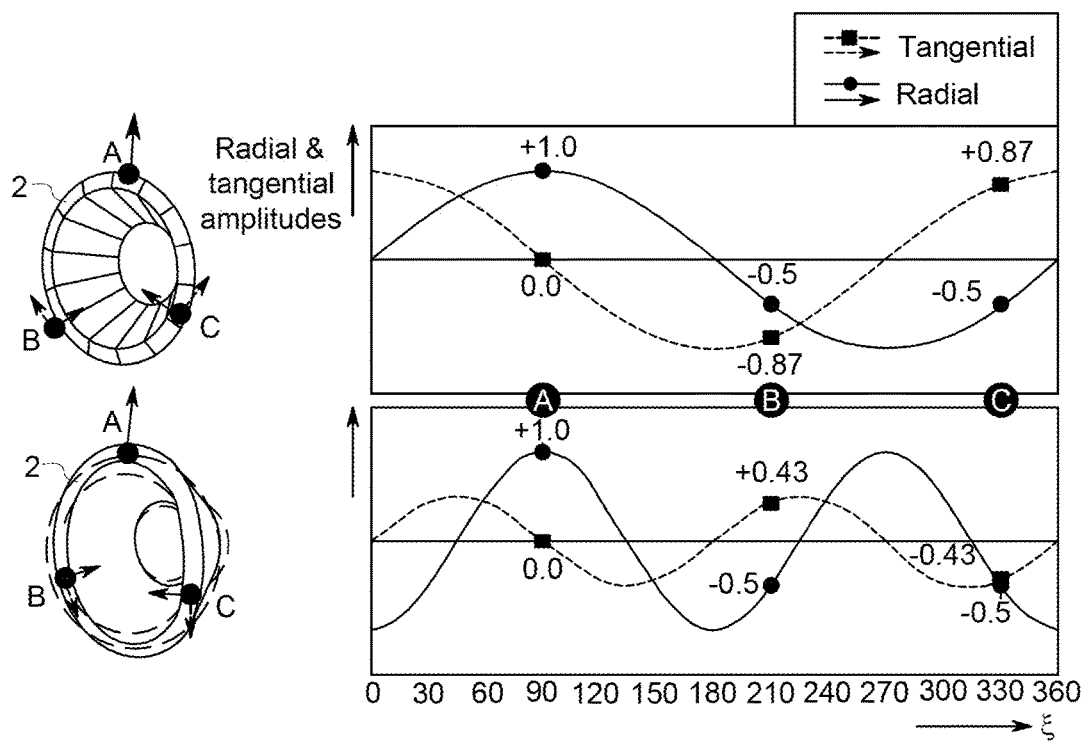
FIG. 3 shows two different displacements of the stator end winding with corresponding diagrams showing the angle along the stator end winding on the x-axis and the length of displacement on the y-axis in dependency of the place along the stator end winding represented by the rotation angle.

FIG. 3 shows a schematic perspective view of two stator end windings 2 at the left with different displacements or deformations from the ideal circle shape. At the left top the deformation at the position denominated with A is in a direction up, illustrated by the arrow at the position A directed upwards. At the position denominated with B, with a 120° rotation angle distance to position A, the displacement is defined by the radial direction by one arrow and the tangential direction by the other arrow, with regard to the cone geometry of the end winding 2. The same applies to the position denominated with C with a 120° rotation angle distance to position A and B. Corresponding to these exemplary displacements or temporary deformations occurring in operation of the electric machine a graph is shown on the right top FIG. 3 referring to the displacements of the stator end winding 2 on the top left. The y-axis of the diagram shows the distance from a zero deformation at the origin, the amplitudes of the deformations. The x-axis of the graph shows the angular position from 0° to 360° along the circle of the stator end winding 2 as described, which is ζ. The positions A, B, C at the stator end winding 2 are also depicted in the graph with A at 90°, B at 210°, and C at 330°. As is visible in the graph the radial displacement is at the position A given with +1 as a normalized dimension. At the position B the displacement is given with −0.5, at the position C the displacement is given with −0.5. The assumed radial displacement is shown with a solid line in the graph connecting the points A, B, C. The displacement around the whole circle is an assumption or interpolation as in this example the displacement is only measured at the three positions A, B, C. The displacement in the tangential direction at the edge of the stator end winding 2 is shown by the dotted line in the graph. The tangential direction is the direction as indicated by the arrow tangentially to the stator end winding 2 and the housing 4 of the stator 1. As can be seen the displacement in the tangential direction is zero at the position A, −0.87 at the position B, and −0.5 at the position C. This kind of deformation is represented by a 2-node shape. In the 2-node shape a movement in the vertical and/or horizontal direction is present. The term node is also defined in the norm IEC CD 60034-23 (2015-01-23). Generally, at a node no deformation in the radial direction is measurable. In the schematic view of the stator end winding 2 at the left bottom the displacement of the stator end winding 2 is different to the displacement at the left top. This different displacement is illustrated by the arrows in different directions at the positions B, C in the radial and tangential direction. The cone in this example is stronger compressed in a horizontal direction than the cone above, so that the horizontal diameter is reduced temporarily, as can be seen in FIG. 3. This kind of deformation is represented by a 4-node shape, the deformation has two lobes in the contrary to one lobe of the cone above. The 4-node shape has an elliptical deformation of the front circle of the conus, which means a radial movement outwards at two diametrically opposed points and a radial movement inwards at two other diametrically opposed points. A deformation of the stator end winding 2 is composed by definition of several node-shapes (2-node, 4-node, 6-node, 8-node), here the 2-node and 4-node shapes are measured with their corresponding shares. The nodes hereby have by definition no deformation in the radial direction, the deformation is measured in relation to the nodes. The displacement in the bottom example measured in a radial direction is identical to the displacement of the example at the top. The radial displacement is again +1.0, −0.5, −0.5 at the positions A, B, C, respectively. The temporarily deformations at the bottom cone are in a vertical and horizontal direction, i.e. the edge of the bottom cylinder is shifted horizontally and vertically. Both examples, 2-node shape and 4-node shape, are the typical deflections in operation. By this example according to FIG. 3 it is explained that the unambiguous displacement of the stator end winding 2 cannot be derived from the mere measurement of the radial displacement. This is at least true for the measurement at three positions. The tangential displacement in the bottom example is measured to 0, +0.43, −0.43 at the positions with 120° angle distance denominated with A, B, C, respectively. The tangential displacement is shown by the dotted lines in the graph. The tangential displacements essentially contribute to the whole displacement of the stator end winding 2. As is illustrated in FIG. 3, the measurement of the radial displacement which is done in the state of the art and shown by the solid lines does not provide the entire effect of the vibrations. By measuring the radial amplitudes and phases alone the deformations of the top left and bottom left are interpreted the same despite that different deformations exist. This leads to the wrong conclusion that the deformations of the two examples above and below are the same. As is disclosed in the invention the addition of measurement results of tangential amplitudes and phases to the measurement results of the radial amplitudes and phases ensures that the operator can receive sufficient data to conclude the actual deformations or displacements. The invention thus provides a true shape analysis. It is to be observed that these true shape analysis can commonly only be achieved with the application of typically six sensors, minimum 5 sensors. The invention enables the measurement of physical deformations with only three sensors 6. Hereby, the 2-node and 4-node shares of the deformations are considered.

Figure 4:
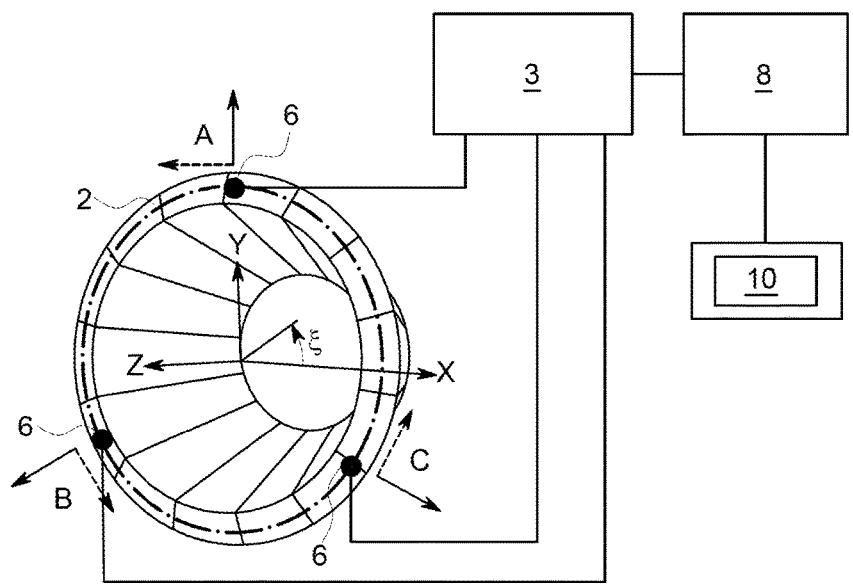
FIG. 4 shows a schematic view of a stator end winding similar to FIG. 2, with the counting-directions for radial, tangential and axial displacements of the stator end winding in operation at the three places of sensors, a measurement device for receiving the measurement data, and a calculation device calculating the displacements of the measurement data.

FIG. 4 shows a schematic view of a stator end winding 2 similar to FIG. 2. At the stator end winding 2 three sensors 6 are attached at the positions A, B, C. The sensors 6 are suitable for measuring displacements caused by vibrations in operation or maintenance of the electric machine. According to an example of the invention the sensors 6 measure the displacement of the stator end winding 2 at the given three positions in the radial direction. The sensors 6 also measure the displacement of the stator end winding 2 in the tangential direction. The measurement data is transmitted from the sensors 6 to a measurement device 5 which receives and stores the data. The data transmitted is essentially the data as described under FIG. 3 and shown in the graphs. The measurement data from the measurement device 5 is transmitted to a calculation unit 8. Where the calculation unit may be a processor. In the calculation unit 8 look-up tables are stored to compare the measurement date from the stator end winding 2 with stored empiric data. The data regarding the radial displacement and the data regarding the tangential displacement are assigned to displacement schemes of the stator end winding 2. For example is the data from the top of FIG. 3, +1.0/−0.5/−0.5 in radial direction, 0.0/−0.87/+0.87 in the tangential direction, assigned to a deformation picture according to FIG. 3 above at the left. Similarly, the data from the bottom of FIG. 3, +1.0/−0.5/−0.5 in radial direction, 0.0/+0.43/−0.43 in the tangential direction, is assigned to a deformation picture according to FIG. 3 below at the left. To find out the true (i.e. physically present) co- and counter rotational waves at the stator end winding 2, the following two physical characteristics can be used:

1. The tangential vibration is with a lagging phase of 90 degrees, if using a cylindrical coordinate system for the vibration measurements. This means a phase shift of −90 degrees for the co-rotational waves and +90 degrees for counter-rotational waves.

Figure 5:
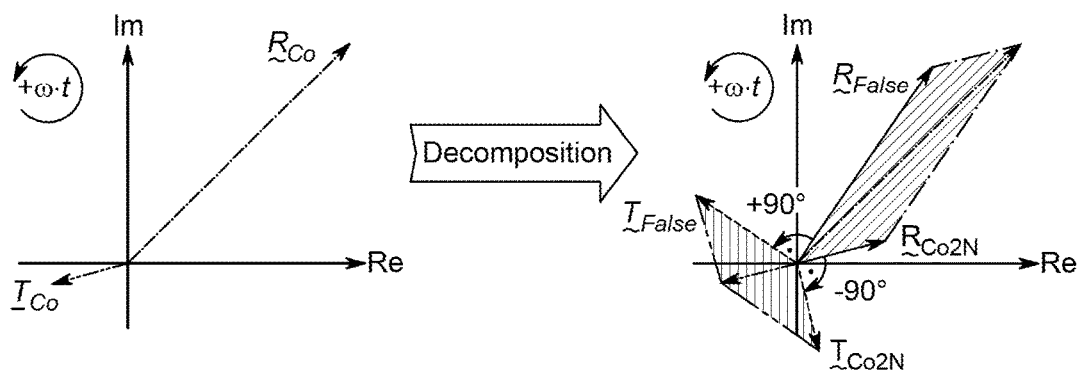
FIG. 5 shows two phasor diagrams in the complex domain with measured co-rotational radial and tangential phasor at the left, and calculated co-rotational radial and tangential phasor at the right with falsely deduced co-rotational radial and tangential phasors.

2. The tangential vibration amplitude of a 2-node shape is with the same amplitude as the radial vibration, but just at another position. However, the amplitude of tangential vibration is half of the radial one for a 4-node shape. Both characteristics can be used to formulate mathematical equations for the extraction of the 'true' 2-node content from a 2-node analysis. The complex radial and tangential phasors are shown in the diagram of FIG. 5 on the left side with the radial co-rotational space phasor $\tilde{R}_{Co}$ and the tangential co-rotational space phasor $\tilde{T}_{Co}$. On the right side of FIG. 5 the corresponding complex diagram is shown after decomposition accomplished in the calculation unit 8 by a computer program stored and run in the calculation unit 8. In FIG. 5, right side, the calculated co-rotational phasor $\tilde{R}_{Co2N}$ is shown, which represents the correct displacement in the radial direction, the true rotational wave. Accordingly, the calculated co-rotational phasor $\tilde{T}_{Co2N}$ is shown, which represents the correct displacement in the tangential direction and which is rotated by −90° from $\tilde{R}_{Co2N}$. Also shown for $\tilde{R}_{Co}$ and $\tilde{T}_{Co}$ are wrongly deduced space phasors $\tilde{R}_{False}$ and $\tilde{T}_{False}$ which are calculated without applying the invention. These false deductions regarding the displacements occur in particular in 4-node shapes similar to these shown in FIG. 3 bottom.

For the following equations the constraints below apply.

$\tilde{R}_{Co2N}$, $\tilde{R}_{Counter2N}$ Phasors which represent the physical co- and counter-rotational 2-node wave of radial vibration;

$\tilde{R}_{Co4N}$, $\tilde{R}_{Counter4N}$ Phasors which represent the physical co- and counter-rotational 4-node wave of radial vibration;

$\tilde{R}_{Co}$, $\tilde{R}_{Counter}$ Calculation results obtained for radial vibration measurements for a 2-node shape analysis;

$\tilde{T}_{Co}$, $\tilde{T}_{Counter}$ Calculation results obtained for tangential vibration measurements for a 2-node shape analysis;

Below is the equation (1) for the decomposition of the co-rotational space phasors.

$$\tilde{R}_{Co2N} = \left[\frac{1}{3}\mathrm{Re}(\tilde{R}_{Co}) - \frac{2}{3}\mathrm{Im}(\tilde{T}_{Co})\right] + j\left[\frac{1}{3}\mathrm{Im}(\tilde{R}_{Co}) + \frac{2}{3}\mathrm{Re}(\tilde{T}_{Co})\right] \quad (1)$$

Below is the equation (2) for the decomposition of the counter-rotational space phasors.

$$\tilde{R}_{Counter2N} = \left[\frac{1}{3}\mathrm{Re}(\tilde{R}_{Counter}) + \frac{2}{3}\mathrm{Im}(\tilde{T}_{Counter})\right] + j\left[\frac{1}{3}\mathrm{Im}(\tilde{R}_{Counter}) - \frac{2}{3}\mathrm{Re}(\tilde{T}_{Counter})\right] \quad (2)$$

For the co-rotational phasor of the 4-node shape the following equation (3) applies.

$$\tilde{R}_{Co4N} = [\tilde{R}_{Counter} - \tilde{R}_{Counter2N}] \quad (3)$$

For the counter-rotational phasor of the 4-node shape the following equation (4) applies.

$$\tilde{R}_{Counter4N} = [\tilde{R}_{Co} - \tilde{R}_{Co2N}] \quad (4)$$

The measurement data and the assigned deformation pictures are shown to an operator at a display 10 connected to the calculation unit 8. The format of the displayed data can be modified to moving pictures showing the circle around the stator end winding 2 in real time, and/or depicting the data in the frequency or spectral domain. The operator is enabled to attain the deflection shape of the stator end winding 2 in operation.

While the invention has been described in detail with reference to exemplary embodiments thereof, it will be apparent to one skilled in the art that various changes can be made, and equivalents employed, without departing from the scope of the invention. The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments as are suited to the particular use contemplated. It is intended that the scope of the invention be defined by the claims appended hereto, and their equivalents.

The invention claimed is:

1. A measurement method for measuring vibrations at a stator end winding of an electric machine, comprising:
   arranging sensors at the stator end winding at different positions;
   measuring the vibrations with sensors;
   measuring amplitudes and phases of radial vibrations and tangential vibrations of the vibrations with the sensors;
   deriving displacements of the stator end winding due to the vibrations via the measured amplitudes and/or phases of the radial vibrations and the tangential vibrations;
   assigning the derived displacements to an operation deflection shape of the stator end winding;
   deriving the operation deflection shape of the stator end winding based on 2-node shapes and/or 4-node shapes using a calculation unit; and
   displaying attained measured data and assigned operation deflection shape on a display.

2. The measurement method according to claim 1, wherein assigning the derived displacements to an operation deflection shape of the stator end winding uses empiric data stored in the calculation unit for comparison with the measured amplitudes and/or phases of the radial vibrations and the tangential vibrations.

3. The measurement method according to claim 1, wherein the sensors for measuring the vibrations are each arranged at the stator end winding at equidistant positions one from another.

4. The measurement method according to claim 2, wherein the assigned operation deflection shape is a four-node operation deflection shape in which the operation deflection shape is defined by deflection of four nodes at the stator ending winding.

5. A measurement device for measuring vibrations at a stator end winding of an electric machine, the measurement device comprising:
   three sensors arranged at different equidistant positions of the stator end winding operable for measuring amplitudes and phases of radial vibrations and tangential vibrations of the vibrations;

a calculation unit operable for deriving displacements of the stator end winding due to the vibrations via the measured amplitudes and/or phases of the radial vibrations and the tangential vibrations, and operable for attaining data and assigning a deflection shape of the stator end winding in operation based on 2-node shapes and/or 4-node shapes; and a display for displaying the attained measured data and assigned operation deflection shape of the stator end winding in operation.

6. The measurement device for measuring vibrations at the stator end winding according to claim 5, wherein the calculation unit assigns the displacements to an operation deflection shape of the stator end winding using empiric data stored in the calculation unit for comparison with the measured amplitudes and/or phases of the radial vibrations and the tangential vibrations.

7. The measurement device for measuring vibrations at the stator end winding according to claim 6, wherein the calculation unit derives the operation deflection shape of the stator end winding based on the 4-node shapes.

8. A computer program stored on the calculation unit for processing the measurement method according to claim 1.

\* \* \* \* \*